(12) United States Patent  (10) Patent No.: US 7,428,695 B2
Chiang et al.  (45) Date of Patent: Sep. 23, 2008

(54) SYSTEM FOR AUTOMATIC GENERATION OF ARBITRARILY INDEXED HYPERLINKED TEXT

(75) Inventors: Alexander Chiang, Urbana, IL (US); Joe D. Bolding, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1400 days.

(21) Appl. No.: 09/986,221

(22) Filed: Oct. 22, 2001

(65) Prior Publication Data

US 2004/0205497 A1    Oct. 14, 2004

(51) Int. Cl.
*G06N 3/00*    (2006.01)
(52) U.S. Cl. ...................................... 715/201
(58) Field of Classification Search ................. 715/501, 715/513, 517, 500.1, 201; 345/733
See application file for complete search history.

(56) References Cited

U.S. PATENT DOCUMENTS

| | | | | |
|---|---|---|---|---|
| 5,708,825 A | * | 1/1998 | Sotomayor | 715/501.1 |
| 6,182,065 B1 | * | 1/2001 | Yeomans | 707/3 |
| 6,253,198 B1 | * | 6/2001 | Perkins | 707/3 |
| 6,256,631 B1 | * | 7/2001 | Malcolm | 707/10 |

* cited by examiner

*Primary Examiner*—Stephen Hong
*Assistant Examiner*—Kyle R Stork (57) ABSTRACT

A system that indexes text according to an arbitrary set of indices and automatically generates hyperlinks from each index to a related subject in a document. A text file containing the documentation of interest is used as input to a hyperlink processing program that generates a file containing links to all of the topics of interest. A category file is then created that indicates an association between each of the topics and corresponding subjects included in each topic. Next, a data structure is generated that associates each topic with corresponding subject names. A plurality of subject name files is generated, each including HTML (hypertext markup language) text corresponding to an associated subject, and a file comprising said hyperlinks to each of the subject name files is generated. A plurality of index files is generated, each including hyperlinks between each of the topics and corresponding subject name files. A list of category names corresponding to a primary set of indices is displayed in a first window, and a secondary set of said indices comprising a list of subject names is displayed in a second window, in response to a user selecting one of the category names. Finally, in response to a user selecting one of the subject names in the second window, the text in the subject name file corresponding to the subject name selected by the user is displayed in a third window.

16 Claims, 5 Drawing Sheets

SYSTEM FOR AUTOMATIC GENERATION OF ARBITRARILY INDEXED HYPERLINKED TEXT

FIELD OF THE INVENTION

The present invention relates generally to computer system text processing, and more particularly, to a system for automatic generation of arbitrarily indexed hyperlinked text.

BACKGROUND OF THE INVENTION

Statement of the Problem

A 'hyperlink' is defined as a mechanism implemented via a computer system which allows a viewer to link (or jump) from a source location in a document to a destination location in the same or different document. The hyperlink is the combination of a display element or an indication (generally visual) that a hyperlink is available for a particular hyperlink source, and a computer program (typically a web browser) which finds and displays the hyperlink destination. A hyperlink thus provides a computer-assisted way for a human user to efficiently move between various locations containing information which is somehow related.

A significant problem with generating information for computer-based hyperlink systems is that an author (system developer) must review the material to be hyperlinked, identify topics to which to hyperlink, and must also manually set up the hyperlinks. This is a time-consuming and labor-intensive process. Some of the disadvantages of manually creating arbitrarily indexed hyperlinked documentation for include:

Since commands can be indexed in arbitrary groups (not necessarily alphabetically), hand editing is required. This is not desirable, since manual entry of the necessary hyperlinking tags frequently results in mistyped links, rendering the documentation useless.

Since care must be taken to ensure that hand-generated links are accurate, the process of creating documentation manually is very slow and tedious. Therefore, documentation may be out-of-date and no longer relevant.

Both of the above problems are exacerbated when there are hundreds of commands to hyperlink to each other, and also when the documentation is frequently updated. In addition, after the documentation is updated, it must be updated on the web server. This may be a problem if the person maintaining the documentation is not a web site administrator, and thus must wait until an administrator is available to make the necessary updates.

Furthermore, every time a change is made to a document of interest, the author must manually update links to the changed documentation.

What is needed is a system that automatically generates hyperlinks from indexed text in one document to one or more related topics in another document. There is also a need for a system that automatically updates the hyperlinks generated thereby to Internet-accessible web pages.

Solution to the Problem

The present system solves the above problems and achieves an advance on the field by providing a system that indexes text according to an arbitrary (i.e., not necessarily alphabetical) set of indices and automatically generates hyperlinks from each index to a related topic in a document. By automating the document linking and updating process, the chances of introducing errors into the hyperlinking process are greatly reduced, if not eliminated. Documentation is kept up-to-date and relevant. Furthermore, the documentation is instantly available over the Internet, since the present invention automatically copies all of the necessary files to the appropriate web server. In addition, it is no longer necessary to wait for the web server administrator to make updates to new or modified documentation.

A text file containing the text of the documentation of interest is used as input to a hyperlink processing program that generates a file containing links to all of the topics of interest in the documentation. In one embodiment of the present system, the hyperlink processing program performs the steps set forth below.

A category file is created that indicates an association between each of the topics and corresponding subjects included in each topic;

a data structure is generated that associates each topic with corresponding subject names in accordance with the association defined in the category file;

a plurality of subject name files is generated, each including HTML (hypertext markup language) text corresponding to an associated subject;

a global index file comprising said hyperlinks to each of the subject name files is generated;

a plurality of index files is generated, each including hyperlinks between each of the topics and corresponding subject name files in accordance with the data structure;

a list of category names corresponding to a primary set of indices is displayed in a first window, using hyperlinks in the index files;

a secondary set of said indices comprising a list of subject names is displayed in a second window, in response to a user selecting one of the category names; and in response to a user clicking on one of the subject names in the second window, the text in the subject name file corresponding to the subject name selected by the user is displayed in a third window, using hyperlinks in the global index file.

The present system also automatically updates the associated hyperlinks to other information located on the Internet-accessible web pages.

DETAILED DESCRIPTION

Figure 1:
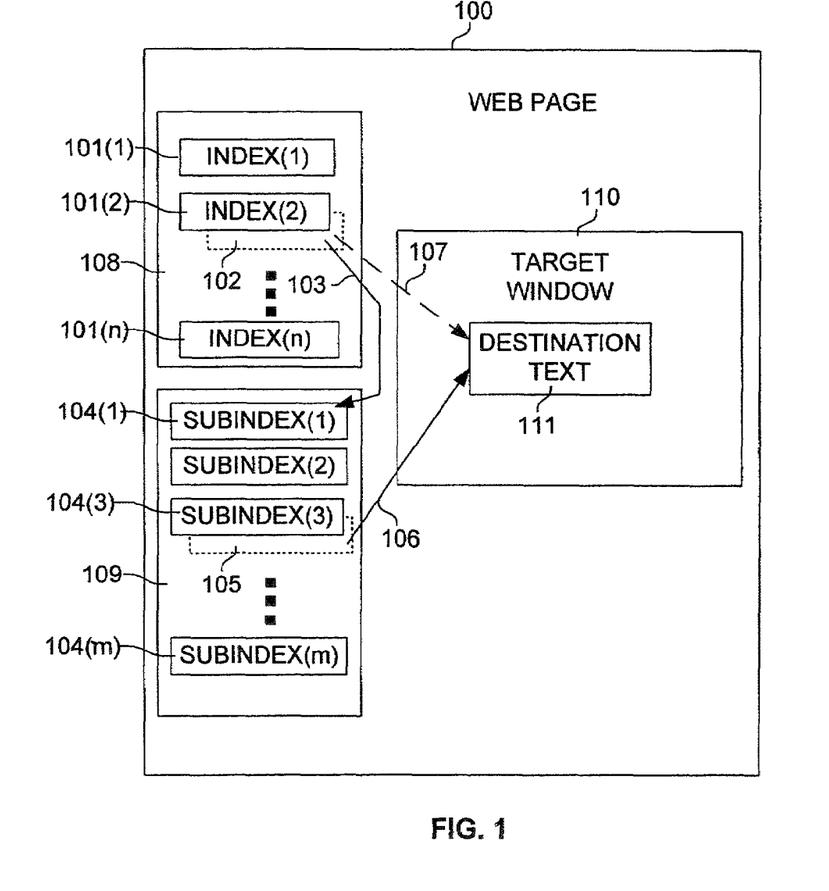
FIG. 1 illustrates a web page showing the use of hyperlinks in an exemplary embodiment.

FIG. 1 illustrates a web page screen display 100 showing the use of hyperlinks in an exemplary embodiment of the present invention. A hyperlink is an active area ('hot area') in a displayed document that when 'clicked' on (e.g., by a mouse), causes the user's browser to load an entity referenced by a URL (universal resource locator, which specifies the Internet address of the referenced item ).

An anchor is an area within the content of a hypertext node (e.g. a web page) which is the source or destination of a hyperlink. A source anchor may be a word, phrase, image, or possibly the whole node. A destination anchor may be a whole node or some position within the node. Typically, clicking with a mouse on a source anchor causes the link to be followed (by the user's web browser) and the anchor at the destination end of the link to be displayed. A destination anchor is simply an anchor placed in a file at a hyperlink destination.

Anchors are typically highlighted in some way (either always, or when the mouse is over them), or they may be marked by a special symbol. In HTML (HyperText Markup Language), anchors are created with the <A..>..</A> construct. The opening A tag of a source anchor has an HREF (hypertext reference) attribute giving the destination in the form of a URL—usually a whole node or 'page'. Consider the following hyperlink definition:

<a href="next.html" target="window">click here</a>

When a user clicks on the 'hot area' (source anchor) represented by "click here", the document "next.html" will be loaded into the window or frame named "window." The anchor (<a>) tag is the HTML feature for defining both the source and the destination of the hyperlink.

As shown in FIG. 1, a hyperlink is conceptually represented by arrow 103 between a hyperlink source 101(2), which is located in a first data file, and a hyperlink destination 104(1), which can be located in the same or in a second data file. As shown in FIG. 1, text window 108 includes a plurality of (i.e., n) textual or graphical hyperlink source entities 101 (*) [where the '*' symbol indicates a wildcard representing any member of the class of items having the same basic reference number], indicated as Index (1)—Index(n). Each text entity (hereinafter referred to as an index) 101(*) has an associated HTML source anchor. For example, Index(2) [reference number 101(2)] has the associated anchor 102, which has Subindex(1) 104(1) as its destination in target window 109. The hyperlinked association between Index(2) and Subindex(1) is indicated by arrow 103. Alternatively, a source anchor in window 108, such as index(2) may have a destination anchor in a different window, as indicated by arrow 107 to destination ('target') text 111 in window 110.

The present example is set in the context of a web page 100 that is used for displaying 'help' information about a system. For example, the items depicted by indices Index(1)-Index(n) [reference numbers 101(10-101(n)] may be categories of system commands, such as "script" commands or "run" commands, for which a user desires information. One of the text entities, e.g., Index(1), may be a category that includes all of the commands (or other entities) for which a target text entity 111 may be displayed.

When a user of the present system selects a particular command category, by clicking a mouse on the category name, a list of all of the commands in the category are displayed in a separate window. For example, if Index(2) in window 108 indicates "run commands", when the user selects (clicks on) the corresponding hot area 101(2) associated with Index(2), the text entities (sub-indices) Subindex(1), Subindex(2), and Subindex(3) in window 109 [shown by reference numbers 104(1)-104(3)] will then be displayed as a list of members of the selected category of commands such as "continue", and "continue_one", and "step", respectively.

If the user then desires to see the specific help information, e.g., for the "step" command, the hot area [Subindex104(3)] for this command is selected (clicked on) in window 109, and the associated ('target') text 111 is displayed in main window 110 on the web page screen display 100. The mechanism by which these operations are performed is explained below in detail with reference to FIGS. 2, 3, 4A and 4B.

Alternatively, the items depicted by text entities Index(1)-Index(n) may be topics in a document (instead of system commands), in which case the text entities Subindex(1)-Subindex(m) are related subtopics or subjects, i.e., names of members of the class denoted by the selected Index 101(*). In this case, the target text 111 displayed in target window 110 describes the selected subtopic or subject, rather than a system command.

The HTML frame for the screen display 100 is generated by copying common files, for example, a gif file for the basic web page frame graphics, a .css file that describes the frame, and the index.html frame (the display screen html frame that points to the text for windows 108/109. These common files are stored in a known location, such as in the Command Name directory 212, described below with respect to step 435.

Figure 2:
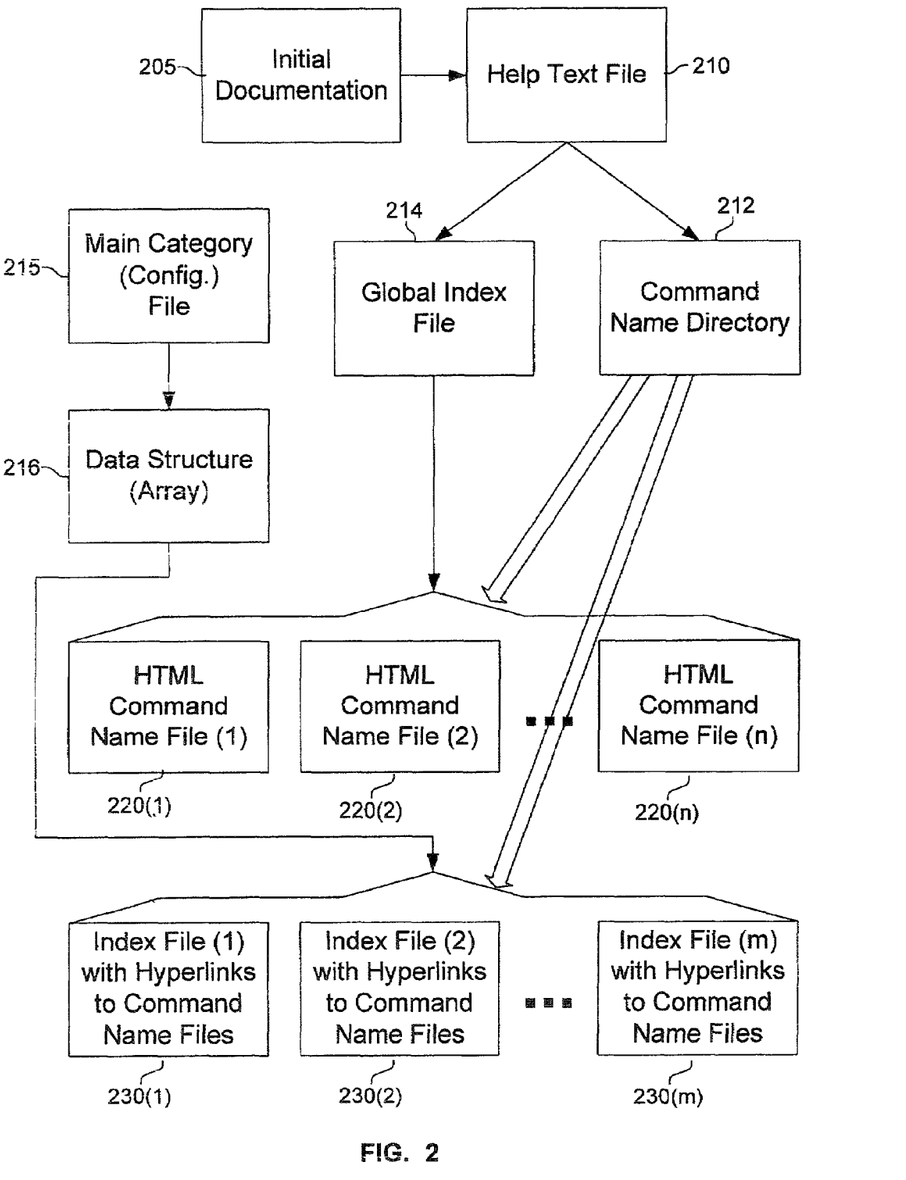
FIG. 2 is a diagram showing the data organization in one embodiment of the present system.
Figure 3:
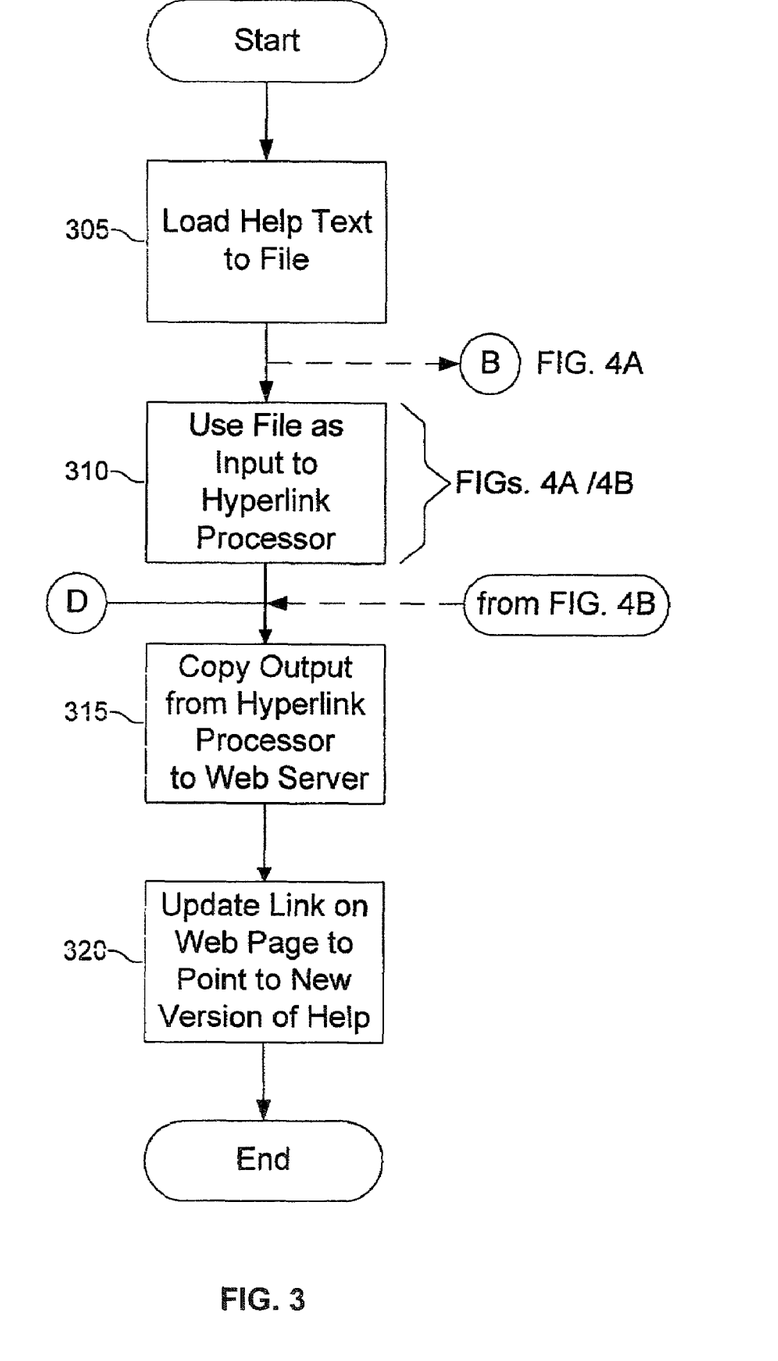
FIGS. 3, 4A, and 4B are flowcharts illustrating an exemplary sequence of steps performed in carrying out one embodiment of the present system.
Figure 4A:
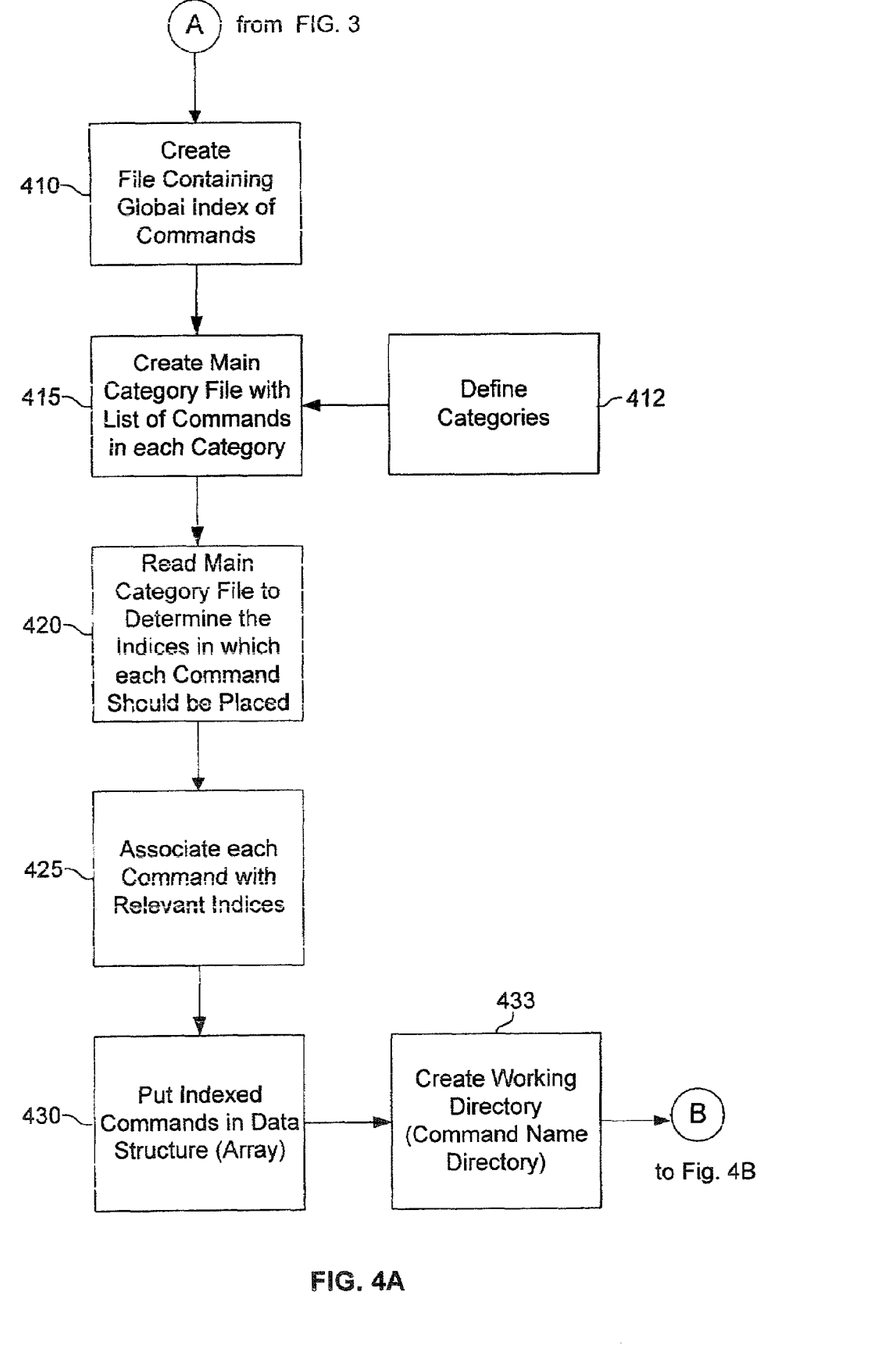
Figure 4B:
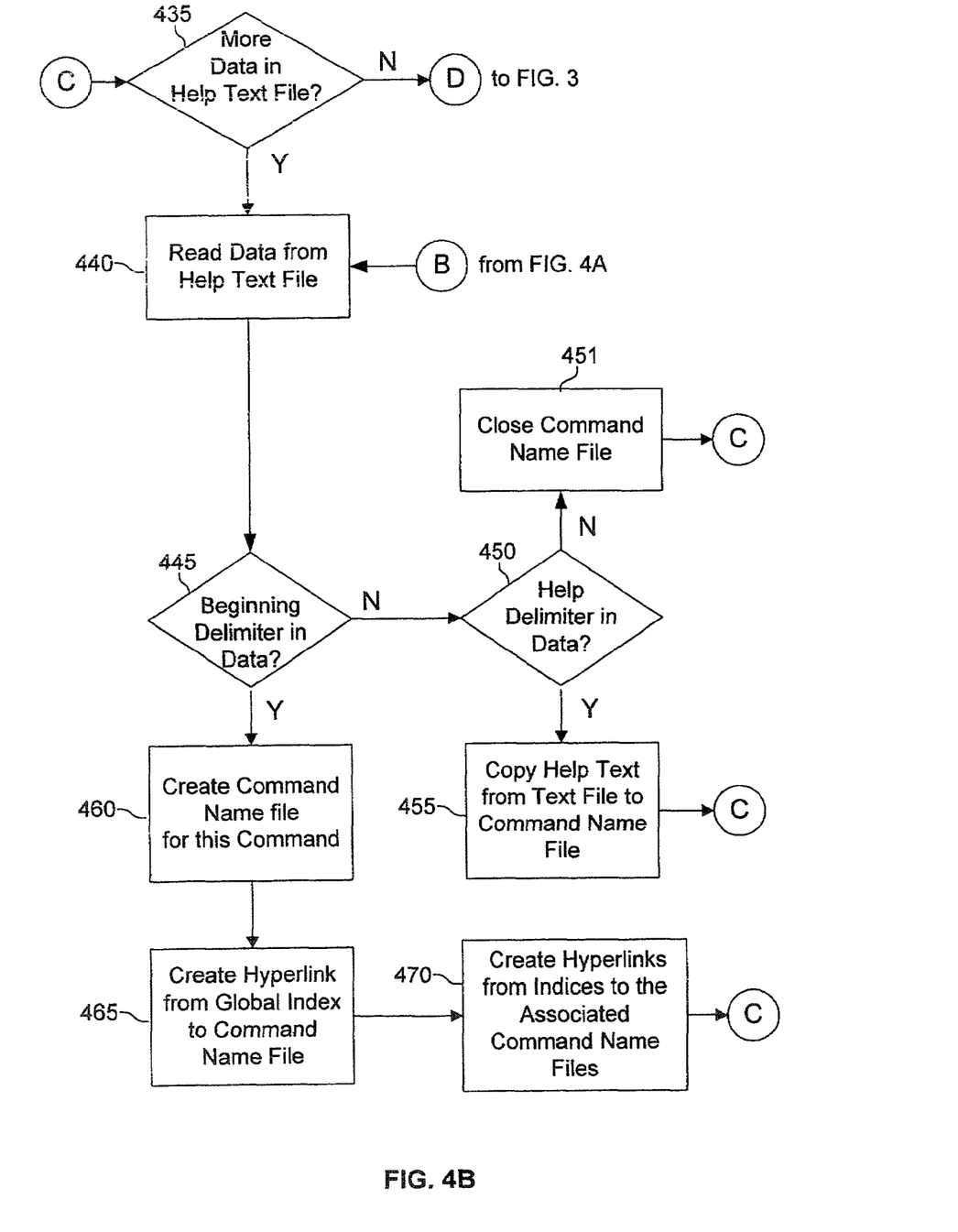

FIG. 2 is a block diagram illustrating basic data components in an exemplary embodiment of the present system. As shown in FIG. 2, Help Text File 210 contains all of the help documentation, in plain text or ASCII format, for the system of interest. Operation of the present system is best understood by reference to FIG. 2 in conjunction with the flowcharts of FIGS. 3, 4A, and 4B, as described below. FIGS. 3, 4A, and 4B are flowcharts illustrating an exemplary sequence of steps performed in carrying out one embodiment of the present system. As shown in FIGS. 2 and 3, at step 305, all of the help text documentation (or other documentation of interest) in a software program or other file (the 'initial documentation') 205 is loaded into Help Text File 210.

At step 310, Help Text File 210 is then processed by a hyperlink processor program, the details of which are explained below with respect to FIGS. 4A and 4B. Table 1, below, shows an exemplary format for three of the entries in the Help Text File 210, which contains a number of entries equal to the number of commands or subjects which may be separately referenced (e.g., the number of text entities 111 which can be separately displayed in target window 110). Each entry in the file is separated by the delimiters "Command:" and "End:", and the delimiter "Help:" is employed to indicate the beginning of the help text for each command entry. These delimiters are generated and inserted when the Help Text file 210 is generated.

TABLE 1

Help Text File

Command:
breakpoint enable
breakpoint enable <index> [<cnt>]
Help:
Enable breakpoint number <index>. If <index> is −1, enable all breakpoints. If <cnt> is provided, the breakpoint will be skipped the first <cnt> times it is hit.
Use the command 'breakpoint list' for a list of all breakpoints.
End:
Command:
create parisc
create parisc <parisc>
Help:
Create a parisc template named <parisc>. <parisc> may then be used in the 'create dna' command. See help for 'param parisc' for available parameters and default values
End:
Command:
Step
step [<count>]
Help:
Single step the current cpu for <count> instructions.
If <count> is omitted, single step one instruction.
See 'help continue' for a description of events that will cause an early termination of this command.
End:

As shown in FIG. 4A, at step 410, Global Index file 214, containing a list of all of the commands (or other index words), is created by reading Help Text file 210 and inserting, in order, each of the command names found in file 210 into the Global Index file 214.

The HTML code for the hyperlinks used in the present system is generated at this step. The Help Text file 210 and the Global Index file 214 are generated using two input files, the text documentation files in the initial document 205, and a manually generated Main Category file 215. From these two files, Global Index file 214, an Index Category file 230(*) for each category in the Main Category file 215, and a Command Name file 220(*) for each command in the Help Text file 210, are generated. These files are described in detail below.

Exemplary contents of Global Index file 214 are shown below in Table 2.

TABLE 2

Global Index File

```
<!DOCTYPE HTML PUBLIC "-//W3C//DTD HTML 4.0
Transitional//EN" "http://www.w3.org/TR/REC-html40/loose.dtd>
<html>
<head>
   <title>All Commands</title>
   <link REL="STYLESHEET" TYPE="text/css" HREF="../beta.css">
</HEAD>
<body>
<div class="frametitle">All Commands
<br>
<a href="script.exit.html" target="helpFrame">.exit</a>
<a href="script.gosub.html" target="helpFrame">.gosub</a>
<a href="script.goto.html" target="helpFrame">.goto</a>
.
.
.
<a href="address.addr.html" target="helpFrame">address addr </a>
<a href="address.encode.html" target="helpFrame">address encode
</a>
<a href="address.rope.html" target="helpFrame">address rope </a>
.
.
.
<a href="run.step.html" target="helpFrame">step </a>
.
.
.
</body>
</html>
```

At step 412, a set of command (or subject) categories is determined, using arbitrary category names as desired. Step 412 may be performed at any time prior to creating the Main Category file in step 415, below.

At step 415, a Main (command) Category file 215 is manually created. Each of the commands (or alternatively, subjects), for which help text is generated, is manually assigned to one or more named categories, and placed in the Main Category file accordingly.

Each category is delimited by a percent sign in the first column of the line. The name of the category follows and has no restrictions. Each command that belongs in a particular category is listed on a separate line. Every command from the start of a particular category to the start of the next category is considered to be a command belonging to that particular category. Commands may belong to any number of categories, as shown in Table 3 below, wherein the "source" command is included in the "Script Commands" category, as well as in the category named "Test Category".

An exemplary segment of Main Category file 215 is shown in Table 3, below.

TABLE 3

Main Category File

```
% Script Commands
.exit
.gosub
.goto
.if
.ifdef
.return
.
.
.
source
source_base
% Run Commands
step
step_all
step_over
continue
continue_one
# The next category illustrates the fact that a command may # belong
to more than one category
% Test Category
source
step_all
```

At step 420, Main Category File 215 is read to determine the indices in which each command should be placed. At step 425, each command (or subject) in Main Category File 215 is associated with one or more indices, using the correspondence set forth in the file 215. At step 430, each command (or subject) is inserted into Data Structure 216, wherein each command is associated with the appropriate indices as indicated by the command-to-category association of step 425. The data structure shown below in Table 4 is a Perl language hash table, wherein each hash has multiple values per key, and each key is an array. It should be noted, however, that any type of array mechanism could be employed to provide the desired association between each command and one or more relevant categories.

TABLE 4

Data Structure for Indexing Commands

```
My $type = " ";
My $cmd = " ";
My $cmd_type = " ";
Open(TMP, $categories);
   # Read in the Main Category file and store it into a global hash.
   # Commands are allowed to belong to more than one category,
   # which is why an array is used.
   # (hashes with multiple values per key)
while(<TMP>) {
   if(/^#/) {
      next;            # the '#' is a comment. Skip it.
   } elsif(/^\s/) {
      next;            # skip blank lines
   } elsif(/^%/) {
      s/^%\s+//;       # trim hash mark and any # leading whitespace
      chomp;           # trim trailing whitespace
      $type = $_;
   } else {
      chomp;
      push( @{$cmds{$_}}, $type);
   }
}
close(TMP);
```

At step 433, text in Help Text File 210 is copied to an intermediate working directory, referred to as Command Name directory 212. Global index file 214, command name files 220(*) and index category files 230(*) (described below)

are also copied to this directory. A segment of a subdirectory named "Help", containing HTML files for the individual command categories, as well as the command names, located in command name directory 212, is shown below.

```
Run_Commands.nav.html
Script_Commands.nav.html
address.addr.html
address.asel.html
address.decode.html
address.encode.html
address.nav.html
```

The Run_Commands.nav.html file, for example, contains the following list of commands:

```
continue
continue_one
step
step_all
step_over
```

All of the files generated by the present system are located in the Command (subject) Name directory 212. At step 433, Index Category files 230(*) are present, but do not yet include any hyperlinks. Hyperlinks are added at step 470, described below.

FIG. 4B illustrates an exemplary instruction loop for parsing the Help Text file 210 to create Command (subject) Name files 220(1)-220(n) and Index files 230(1)-230(m). As shown in FIG. 4B, at step 440, one or more lines of data is read from Help Text file 210.

At step 445, if a beginning (command name) delimiter (e.g., "Command") is encountered in the data read from the Help Text file 210, then an Command Name file 220(*) is created for the term appearing in the line in the file 210 following the delimiter. Each Command Name file 220(*) contains HTML-encoded text for the associated command (or subject). To help illustrate the steps shown in FIG. 4B, the "step" command shown in Table 1 is used as an example:

```
Command:
step
step [<count>]
Help:
Single step the current cpu for <count>
instructions . . .
End:
```

In the above example, it can be seen that the line following the beginning delimiter "Command" contains the text "step". In accordance with the present system, a Command Name file 220(*) containing the HTML code for the present command is generated at step 460. In the present example, a Command Name file 220(*) named "step.html" containing the HTML code for the "step" command is generated. The HTML for step.html is shown below in Table 5.

TABLE 5 step.html

```
<!DOCTYPE HTML PUBLIC "-//W3C//DTD HTML 4.0
Transitional//EN" "http://www.w3.org/TR/REC-html40/loose.dtd>
<html>
<head>
    <title>step </title>
    <link REL="STYLESHEET" TYPE="text/css" HREF="../beta.css">
</HEAD>
<body>
<table width="100%"><tr><td align="right"><div class="ovlink"><a
href="../../overview.html">Overview</a></div></td></tr></table>
<table>
    <tr>
        <td><img src="../archsimt.gif"></td>
        <td>
            <div class="helpversion">halfdome 2.0.17</div>
            <div class="frametitle">generated Thu Jun 28 12:47:54
2001</div></td>
        </td>
    </tr>
</table>
<hr>
<div class="frametitle">step </div>
<br>
usage: <div class="usage">step [<count>]
</div>
<br>
description:
<pre class="desc">
Single step the current cpu for <count> instructions.
If <count> is omitted, single step one instruction.
See 'help continue' for a description of events that will cause
an early termination of this command.
</pre>
<hr>
</body>
</html>
```

At step 465, a hyperlink is created from Global Index File 214 to the appropriate Command Name HITML file 220(*). For example, the hyperlink for the "step" command might appear as:

```
<div class="framelink"><a href="step.html"
       target="helpFrame">step </a></div>
```

The above hyperlink links Index(n) [reference no. 101(n)] in window 108 with the corresponding Subindex(m) [reference no. 104(m)] in window 109.

At step 470, hyperlinks are then created from the indices (categories) in data structure 216 to the associated Command Name files 220(*). As an example, the Index (category) file containing hyperlinks from the Run Commands category to the associated commands in that category is shown below in Table 6.

TABLE 6

```
File name: Run_Commands.nav.html
<!DOCTYPE HTML PUBLIC "-//W3C//DTD HTML 4.0
Transitional//EN" "http://www.w3.org/TR/REC-html40/loose.dtd>
<html>
<head>
    <title>Run Commands</title>
    <link REL="STYLESHEET" TYPE="text/css" HREF="../beta.css">
</HEAD>
<body>
<div class="frametitle">Run Commands</div>
<br>
<a href="continue.html" target="helpFrame">continue </a>
```

TABLE 6-continued

```
<a href="continue_one.html" target="helpFrame">continue_one </a>
<a href="step.html" target="helpFrame">step </a>
<a href="step_all.html" target="helpFrame">step_all </a><
<a href="step_over.html" target="helpFrame">step_over </a>
</body>
</html>
```

Note that, for example, the above hyperlink "step.html" links Subindex(m) [reference no. 104(m)] in window 109 with target window 110, to display corresponding help text 111 (i.e., the text display generated by step.html) therein.

A branch back to step 435 is then taken, where a check is made to determine whether there is any remaining unread data in Help Text file 210. If all of the data in the file 210 has been read, then the parsing of Help Text file 210 is completed, and processing resumes as shown in FIG. 3, beginning at step 315 (described below). If more data remains in the Help Text file 210, then steps 440 through 445 are repeated, as described above.

At step 445, if a beginning delimiter is not encountered, then a check is made for a "Help" delimiter, identifying the beginning of the help text, at step 450. If a Help delimiter is found, then, at step 455, the help text is copied from Help Text file 210 to the appropriate Command Name HTML file 220 (*). Processing of Help Text file 210 then continues, at step 435, until the end of the file is encountered. If a help delimiter is not found, then, by default, the remaining data (line) in the file must be an "End" delimiter, and the Command Name HTML file 220(*) that was just generated is closed, at step 451.

At step 315, the hyperlinked output generated in the above steps (shown in FIGS. 4A and 4B) is copied to the appropriate web server (not shown). Finally, at step 320, Links on web page 100 are updated by the present system to point to the new (or modified) version of the help documentation created in accordance with the process described above.

While exemplary embodiments of the present invention have been shown in the drawings and described above, it will be apparent to one skilled in the art that various embodiments of the present invention are possible. For example, the specific sequence of steps described above in FIGS. 1, 3, 4A and 4B, as well as the particular files and directories shown in FIG. 2, should not be construed as limited to the specific embodiments described herein. Modification may be made to these and other specific elements of the invention without departing from its spirit and scope as expressed in the following claims.

We claim:

1. A system, including a processor, for linking a plurality of indices with related target text associated with each of the subjects comprising the steps of:
    generating a global index file comprising said subjects and a corresponding address of the text associated therewith;
    generating a data structure indicative of a correspondence between said indices and associated said subjects;
    generating a subject name file comprising HTML-encoded target text associated therewith, for each of the subjects;
    generating, for each of the indices, a first set of hyperlinks wherein each of the hyperlinks therein links one of the indices to the target text corresponding to one of the subjects in one of the indices;
    generating a second set of hyperlinks wherein each of the hyperlinks therein links one of the subjects to the text corresponding thereto in the subject name file;
    copying the first set of hyperlinks, the second set of hyperlinks, and the HTML-encoded target text to a web site; and
    updating, on a web site, the hyperlinks necessary to link a web page on the web site to a new version of the document containing the HTML-encoded target text.

2. The system of claim 1, including the additional steps of:
    displaying, in a first window, in accordance with said data structure, a list of the indices;
    displaying, in a second window, a set of sub-indices comprising a list of subjects corresponding to a selected one of the indices in the first window, using a corresponding one of the first set of hyperlinks; and
    displaying, in a third window, said target text in the subject name file corresponding to a selected one of the subjects in the second window, using a corresponding one of the second set of hyperlinks.

3. The system of claim 1, including the step of initially loading said target text from a first text file into a second text file, wherein a beginning delimiter indicating a subject name, and a text delimiter indicating the text associated with the subject name, for each subject therein, are inserted into the second text file.

4. The system of claim 3, including the steps of:
    parsing the second text file to detect said beginning delimiter;
    generating the subject name file for the associated subject name following the beginning delimiter;
    parsing the second text file to detect said text delimiter; and
    copying the text associated with the subject name in the second text file to the subject name file.

5. The system of claim 1, including the steps of:
    defining a plurality of indices;
    creating a category file comprising a plurality of said indices and a group of related subjects corresponding to each of the indices; and
    creating said data structure by associating each said subject with a corresponding one of said indices in accordance with the category file.

6. The system of claim 1, wherein a hyperlink is created that links one of the indices directly with said text associated therewith.

7. A system, including a processor, for generating hyperlinks between a plurality of indices and associated text on a web site comprising the steps of:
    creating a category file indicating an association between each of the indices and corresponding subject names;
    generating a data structure associating said indices and said corresponding subject names in accordance with said category file;
    generating a plurality of subject name files, each including text corresponding to a subject associated therewith;
    generating a global index file comprising said hyperlinks to each of said subject name files;
    generating a plurality of index files, each including hyperlinks between each of the indices and corresponding said subject name files in accordance with said data structure;
    displaying, in a first window, in accordance with said index files, a list of category names corresponding to said indices;
    displaying, in a second window, a set of sub-indices comprising a list of subject names corresponding to a selected instance of said category names, in accordance with said index files, in response to a user selecting one of said category names;
    displaying, in a third window, said text in said subject name file corresponding to a selected one of said subject names, using said hyperlinks in said global index file, in response to a user selecting one of said subject names in the second window;

copying all of said hyperlinks, and said text in said subject name file, to the web site; and updating, on the web site, the hyperlinks necessary to link a web page on the web site to a new version of said associated text.

8. The system of claim 7, including the additional step of encoding the text for each of the subject name files in HTML format.

9. The system of claim 7, including the additional steps of:

initially loading said text from a first text file into a second text file; and inserting a beginning delimiter indicating a subject name, and a text delimiter indicating the text associated with the subject name, for each subject therein, are inserted into the second text file;

wherein the additional steps are performed prior to copying the text to the web site.

10. The system of claim 9, including the steps of:

parsing the second text file to detect said beginning delimiter;

generating the subject name file for the associated subject name following the beginning delimiter;

parsing the second text file to detect said text delimiter; and copying the text associated with the subject name in the second text file to the subject name file.

11. The system of claim 7, including the steps of:

defining a plurality of indices;

creating a category file comprising a plurality of said indices and a group of related subjects corresponding to each of the indices; and creating said data structure by associating each said subject with a corresponding one of said indices in accordance with the category file.

12. The system of claim 7, wherein a hyperlink is created that links one of the indices directly with said text associated therewith.

13. A system, including a processor, for linking, on a web page, a plurality of system commands, categories thereof, and associated text, the system comprising the steps of:

generating a global index file comprising said commands and a corresponding address of the text associated therewith;

generating a data structure indicative of a correspondence between said categories and associated said commands;

generating a command name file comprising HTML-encoded text associated therewith, for each of the commands;

generating, for each of the categories, a first set of hyperlinks wherein each of the hyperlinks therein links one of the categories to the target text corresponding to one of the commands in one of the categories;

generating a second set of hyperlinks wherein each of the hyperlinks therein links one of the commands to the text corresponding thereto in the command name file;

copying the first set of hyperlinks, the second set of hyperlinks, and the HTML-encoded target text to a web site displaying the web page; and updating, on the web site, the hyperlinks necessary to link the web page to a new version of the document containing the HTML-encoded target text.

14. The system of claim 13, including the steps of:

defining a plurality of indices;

creating a category file comprising a plurality of said indices and a group of related subjects corresponding to each of the indices; and creating said data structure by associating each said command with a corresponding one of said indices in accordance with the category file.

15. The system of claim 14, including the additional steps of:

displaying, in a first window, in accordance with said data structure, a list of the categories;

displaying, in a second window, a list of commands corresponding to a selected one of said categories in the first window, using a corresponding one of the first set of hyperlinks; and displaying, in a third window, the text in the command name file corresponding to a selected one of the subjects in the second window, using a corresponding one of the second set of hyperlinks.

16. The system of claim 15, including the steps of:

initially loading said target text from a first text file into a second text file, wherein a beginning delimiter indicating a subject name, and a text delimiter indicating the text associated with the subject name, for each subject therein, are inserted into the second text file;

parsing the second text file to detect said beginning delimiter;

generating the subject name file for the associated subject name following the beginning delimiter;

parsing the second text file to detect said text delimiter; and copying the text associated with the subject name in the second text file to the subject name file.

\* \* \* \* \*

UNITED STATES PATENT AND TRADEMARK OFFICE
CERTIFICATE OF CORRECTION

| | |
|---|---|
| PATENT NO. | : 7,428,695 B2 |
| APPLICATION NO. | : 09/986221 |
| DATED | : September 23, 2008 |
| INVENTOR(S) | : Alexander Chiang et al. |

It is certified that error appears in the above-identified patent and that said Letters Patent is hereby corrected as shown below:

In column 8, line 37, delete "HITML" and insert -- HTML --, therefor.

In column 9, line 53, in Claim 1, after "related" insert -- subjects and --.

Signed and Sealed this

Sixteenth Day of December, 2008

JON W. DUDAS
*Director of the United States Patent and Trademark Office*